UNITED STATES PATENT OFFICE.

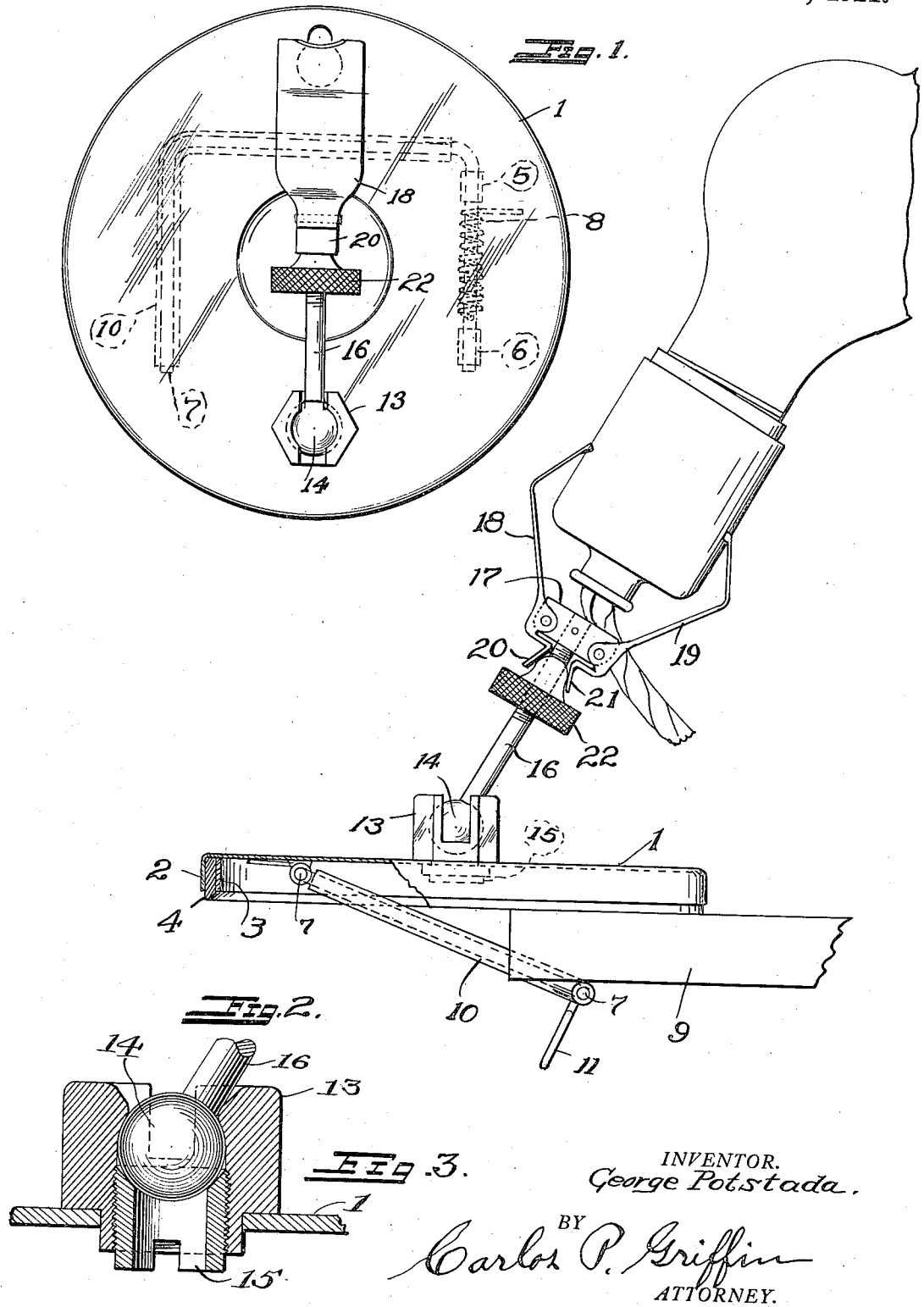

GEORGE POTSTADA, OF OAKLAND, CALIFORNIA.

DISPLAY-CLAMP.

1,394,788.  Specification of Letters Patent.  Patented Oct. 25, 1921.

Application filed November 22, 1919. Serial No. 339,785.

*To all whom it may concern:*

Be it known that I, GEORGE POTSTADA, citizen of the United States, residing at Oakland, in the county of Alameda, State of California, have invented a new and useful Display-Clamp, of which the following is a specification in such full and clear terms as will enable those skilled in the art to construct and use the same.

This invention relates to a display clamp and its object is to provide means whereby a lamp may be held in any desired position on a desk, or whereby any other desired object may be held in a convenient position for display or for examination.

Another object of the invention is to produce a display clamp which is capable of being secured to almost any piece of furniture where a projecting ledge may be found.

Another object of the invention is to provide a clamp for holding the object to be displayed, which is capable of an almost universal movement, so that the clamp secured to the object may be turned to any desired position either with the object in place, or previous to its connection therewith in order that the object to be displayed upon it and lamp or other thing may be shown in a position to accomplish any desired result.

Other objects of the invention will appear as the description proceeds.

An embodiment of the invention is shown in the accompanying drawings in which the same reference numeral is applied to the same portion throughout, but I am aware that there may be modifications thereof.

Figure 1 is a front elevation of the clamp;

Fig. 2 is a side elevation of the clamp partly in section, showing a lamp secured thereto; and Fig. 3 is an enlarged vertical sectional detail view of the ball and socket clamp.

The clamp comprises a circular plate 1, having two flanges 2 and 3 secured thereto, which flanges hold a rubber ring 4, the object of which is to prevent the clamp from marring furniture to which it may be secured.

On the back of the plate 1 there are two small brackets 5 and 6 which pivotally support a U shaped hook 7 and spiral spring 8 surrounding the hook between the brackets 5 and 6 and causing it to bear against the table 9 with sufficient force to hold the plate 1 in the desired position.

The hook 7 is covered with rubber 10 in order to prevent it from marring surfaces upon which it may be placed; and in order to pull the hook out from the plate 1 there is a small finger hook 11 on the end of the U-shaped hook 7.

The front of the plate has a slotted nut 13 secured thereto by soldering or otherwise in which a ball 14 is placed and secured by means of the nut 15 screwed within the nut 13. The ball 14 has an arm 16 connected thereto, which arm terminates in a cross bar 17 having two arms 18 and 19 connected therewith for embracing the objects to be held. The other ends of the arms 18 and 19 are shaped as indicated at 20 and 21 for the purpose of allowing the knurled nut 22 threaded on the shank 16 to be screwed against them and hold said arms with sufficient force against the object to be retained therein to prevent it from being dropped.

It will be seen that while the arms 18 and 19 may be used to embrace a lamp as illustrated, that the device has a large number of other uses and may be used for the display of or for holding any of the desired objects as in shops, show cases, or show windows.

What I claim is as follows, but various modifications may be made in the construction shown in the drawings and above particularly described form, within the purview of my invention:

An object holder comprising a flanged base, a spring clamp for securing the base to a suitable object, the clamp normally lying against the base within the plane of the flange, a slotted nut on said base, a ball therein, an arm connected to said ball, means to frictionally hold the ball in any desired position while permitting it to be moved through a considerable angle in all directions, a standard connected to said ball, and a pair of clamping members carried by said standard.

In testimony whereof I have hereunto set my hand this 6" day of November, A. D. 1919.

GEORGE POTSTADA.